(12) United States Patent
Vänskä et al.

(10) Patent No.: US 12,316,174 B2
(45) Date of Patent: May 27, 2025

(54) METHOD AND AN ARRANGEMENT FOR PRODUCING A SEGMENT COIL

(71) Applicant: ABB Schweiz AG, Baden (CH)

(72) Inventors: Matti Vänskä, Vaasa (FI); Niko Strandström, Vaasa (FI); Heikki Metsberg, Helsinki (FI)

(73) Assignee: ABB Schweiz AG, Baden (CH)

( * ) Notice: Subject to any disclaimer, the term of this patent is extended or adjusted under 35 U.S.C. 154(b) by 538 days.

(21) Appl. No.: 17/753,207

(22) PCT Filed: Aug. 28, 2020

(86) PCT No.: PCT/EP2020/074098
§ 371 (c)(1),
(2) Date: Feb. 23, 2022

(87) PCT Pub. No.: WO2021/038055
PCT Pub. Date: Mar. 4, 2021

(65) Prior Publication Data
US 2022/0286026 A1    Sep. 8, 2022

(30) Foreign Application Priority Data
Aug. 30, 2019    (EP) ................................. 19194521

(51) Int. Cl.
*H02K 15/04*    (2025.01)

(52) U.S. Cl.
CPC ......... *H02K 15/04* (2013.01); *H02K 2213/03* (2013.01)

(58) Field of Classification Search
CPC .. H02K 15/04; H02K 15/045; H02K 15/0428; H02K 3/14; H02K 15/0414; H02K 15/0478
See application file for complete search history.

(56) References Cited

U.S. PATENT DOCUMENTS 5,778,512 A * 7/1998 Ichikawa ............. H02K 15/066
29/598
9,287,743 B2 * 3/2016 Fubuki ................. H01F 41/071
(Continued)

FOREIGN PATENT DOCUMENTS

CN    101677200 A    3/2010
CN    102362318 A    2/2012
(Continued)

OTHER PUBLICATIONS

European Search Report; Application No. EP 19 19 4521; Issued: Feb. 13, 2020; 2 Pages.
(Continued)

*Primary Examiner* — Aneeta Yodichkas
*Assistant Examiner* — Jose K Abraham
(74) *Attorney, Agent, or Firm* — Whitmyer IP Group LLC (57) ABSTRACT

The method includes producing a stack of coil loops from a continuous electrical conductor, the coil loops having two parallel straight side portions and two opposite curved end portions connecting the ends of the side portions. A length of each coil loop in the stack of coil loops decreases, whereby a staggered end portion is formed at each end of the stack of coil elements. The end portion of the stack of coil loops is bent into a predetermined bending angle, whereby the staggering has been determined so that an outer end of the end portion of the stack of coil loops is substantially straight when the stack of coil loops is bent into the predetermined bending angle.

4 Claims, 8 Drawing Sheets

(56) References Cited

U.S. PATENT DOCUMENTS

| | | |
|---|---|---|
| 2010/0026133 A1 | 2/2010 | Fubuki et al. |
| 2010/0194231 A1* | 8/2010 | Rippel .................. H02K 9/227 310/213 |
| 2011/0057537 A1* | 3/2011 | Matsushita ........... H01F 41/071 29/605 |
| 2012/0007460 A1* | 1/2012 | Kitamura ................ H02K 3/12 310/195 |
| 2012/0025658 A1* | 2/2012 | Watanabe ................ H02K 3/12 310/179 |
| 2013/0009509 A1* | 1/2013 | Tsuge .................. H02K 15/066 310/201 |
| 2014/0062230 A1* | 3/2014 | Mori ........................ H02K 3/14 310/58 |
| 2015/0013149 A1* | 1/2015 | Hashimoto .......... H02K 15/045 29/605 |
| 2016/0105087 A1 | 4/2016 | Ikeda et al. |
| 2021/0328486 A1* | 10/2021 | Hirota .................. H02K 15/045 |

FOREIGN PATENT DOCUMENTS

| | | | |
|---|---|---|---|
| CN | 103069692 A | 4/2013 | |
| CN | 104079131 A | 10/2014 | |
| CN | 108832782 A * | 11/2018 | ............. H02K 15/04 |
| DE | 102004034611 A1 | 2/2006 | |
| EP | 1376818 A2 | 1/2004 | |
| EP | 2782224 A1 | 9/2014 | |
| JP | S55138824 A | 10/1980 | |
| JP | 2009153291 A | 7/2009 | |
| WO | 02078155 A1 | 10/2002 | |

OTHER PUBLICATIONS

International Search Report and Written Opinion of the International Searching Authority; Application No. PCT/EP2020/074098; Completed: Nov. 16, 2020; Mailing Date: Nov. 25, 2020; 14 Pages.
Chinese Office Action; Application No. 202080060177.4; Issued: Jul. 14, 2023; 14 Pages.

* cited by examiner

METHOD AND AN ARRANGEMENT FOR PRODUCING A SEGMENT COIL

TECHNICAL FIELD

The invention relates to a method and an arrangement for producing a segment coil.

BACKGROUND

Electric machines i.e., electric motors and electric generators are used in many applications. Electric motors are used to drive different kinds of machines and electric generators are used to produce electric power.

An electric machine may comprise a rotating shaft, a rotor on the shaft, a stationary stator, and a frame. The rotor may be provided with a rotor winding. The stator may comprise a stator core with a stator winding.

The shaft may be supported via bearings on end plates, said end plates being attached to the frame.

Big electric machines may have a stator core made of segments. Each stator segment may comprise axially directed grooves for the stator coils. Straight portions of the stator coils may be seated in the grooves and the end portions of the stator coils may be positioned in end spaces in the electric machine. The end spaces in the electric machine are provided beyond both axial ends of the stator core.

The end spaces may be rather restricted, which means that the end portions of the stator windings must be bent in order to fit into the limited end spaces. The bending of the end portions may be done in different manners. One possibility is to use three different types of segment coils so that one segment coil has straight ends, a second segment coil has 45 degrees bent coil ends, and a third segment coil has 90 degrees bent coil ends.

Prior art methods for producing segment coils to an electric machine with restricted end spaces are not in all respects satisfactory.

US 2016/0105087 discloses a coil and a method of manufacturing the coil. A flat coil includes at least first and second coil layers having the shape of a ring and stacked, each of the first and second coil layers includes a pair of linear portions facing each other in a first direction and a pair of end portions facing each other in a second direction crossing the first direction, and the flat coil is bent on at least one of the end portions. The flat coil is an a-winding coil and is bent toward the first coil layer from the second coil layer. A first end face of the first coil layer in the second direction and a second end face of the second coil layer in the second direction are positioned on the same plane at the end portion to be bent.

EP 2 782 224 A1 discloses a coil manufacturing method including: a winding step of forming a winding having expected slot placement portions and expected coil end placement portions; a protrusion forming step of forming the expected coil end placement portion into a protruding shape; a crank forming step of forming a stepped portion in the expected coil end placement portion; an opening step of forming the winding so that an interval between the pair of expected slot placement portions gradually increases in the stacking direction of the loops of the conductor; and an arc forming step of forming an edge of the expected coil end placement portion into an arc shape.

SUMMARY

An object of the present invention is to achieve an improved method and arrangement for producing a segment coil.

The method for producing a segment coil according to the invention is defined in the claims.

The arrangement for producing a segment coil according to the invention is defined in the claims.

The method comprises producing a stack of coil loops from a continuous electrical conductor comprising at least one electrical conductor with a rectangular cross-section, the coil loops having two parallel straight side portions running at a distance from each other in a longitudinal direction and two opposite curved end portions connecting the ends of the side portions,
    producing the stack of coil loops so that a length in the longitudinal direction of each coil loop in the stack of coil loops decreases, whereby a staggered end portion are formed at each end of the stack of coil elements,
    bending the end portion of the stack of coil loops into a predetermined bending angle in relation to the longitudinal direction, whereby the staggering of adjacent coil loops in the end portion of the stack of coil loops has been determined so that an outer end of the end portion of the stack of coil loops is substantially straight when the stack of coil loops is bent into the predetermined bending angle,
    the bending of the end portions of the stack of coil loops being done in a bending press comprising a first roll device being supported via a first shaft on a stationary frame and a second roll device being rotatably supported via a second shaft on a swing frame, the first shaft and the second shaft being parallel, the swing frame being rotatably supported on the first shaft, a first surface of the stack of coil loops being positioned against the first roll device and a second opposite surface of the stack of coil loops being positioned against the second roll device, the first roll device forming the inner bending radius for the stack of coil loops when the swing frame is turned around the first shaft so that the second roll device rotates on the second surface of the stack of coil loops in order to bend the stack of coil loops.

The method provides a fairly simple way of producing segment coils for an electric machine.

The invention is especially suitable to be used in big electric machines i.e., electric machines having a nominal power in the order of one or more megawatts. Such big electric machines may have a stator core made of segments. An outer surface of each stator segment may be provided with axially extending grooves receiving the straight portions of the stator winding. The stator winding may be formed of coil loops stacked upon each other to form a segment coil. The coil may be formed of an electrical conductor comprising one or more conductors with a rectangular cross section. The conductor may be made of an electrically conductive material e.g., copper.

The electric machine may be an electric generator or an electric motor.

BRIEF DESCRIPTION OF THE DRAWINGS

In the following, the invention will be described in greater detail by means of preferred embodiments with reference to the attached drawings, in which.

DETAILED DESCRIPTION

Figure 1:
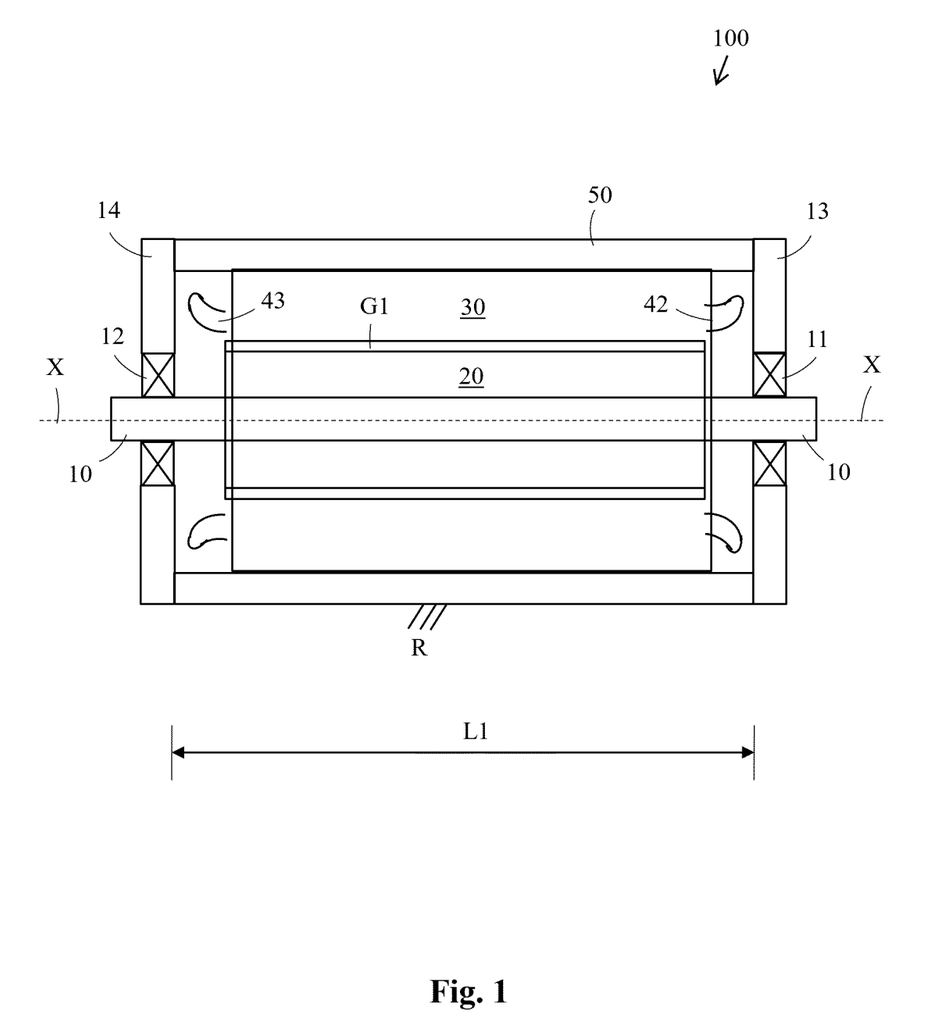
FIG. 1 shows a side view of an electric machine.

FIG. 1 shows a side view of an electric machine.

The electric machine 100 may comprise a longitudinal centre axis X-X, a shaft 10, a rotor 20 attached to a centre portion of the shaft 10, a stator 30 surrounding the rotor 20, and a frame 50 surrounding the stator 30. The rotor 20 and the stator 30 may be cylindrical.

Each end of the shaft 10 may be rotatably supported on a bearing 11, 12. Each bearing 11, 12 may be supported in a bearing house in a respective end plate 13, 14 of the electric machine 100. The end plates 13, 14 may be attached to a respective end of the frame 50.

The rotor 20 may be provided with a rotor winding (not shown in the figure). The stator 30 may comprise a stator core surrounding the rotor 20. The stator 30 core may be provided with a stator winding. The figure shows only the winding ends 42, 43 of the stator winding.

There is an air gap G1 between the outer surface of the rotor 20 and the inner surface of the stator 30.

The frame 50 may be supported on a support structure R at the installation site of the electric machine 100.

The frame 50 has an axial length L1.

The end plates 13, 14 may be attached with fastening means e.g., screws to the frame 50. The fastening means may extend in the axial X-X direction through the end plates 13, 14 to the end of the frame 50.

The electric machine 100 can be an electric motor or an electric generator.

Figure 2:
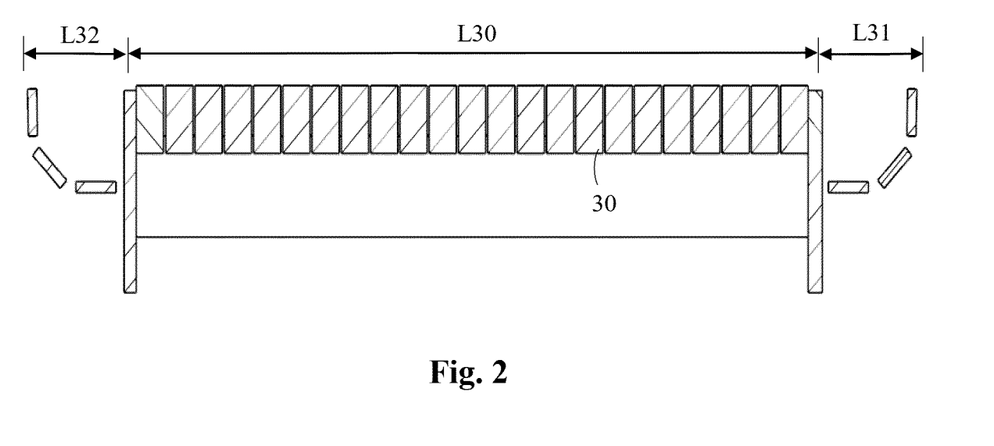
FIG. 2 shows a cross-section of a stator in an electric machine.
Figure 3:
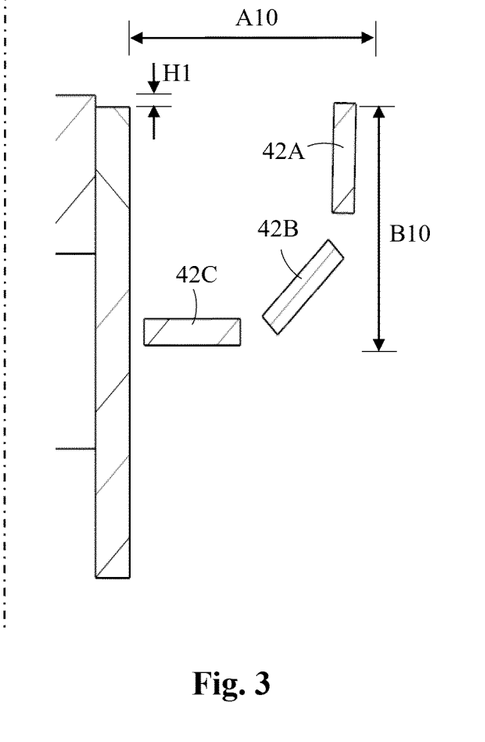
FIG. 3 shows an enlargement of a right-hand end portion of the stator of FIG. 2.
Figure 4:
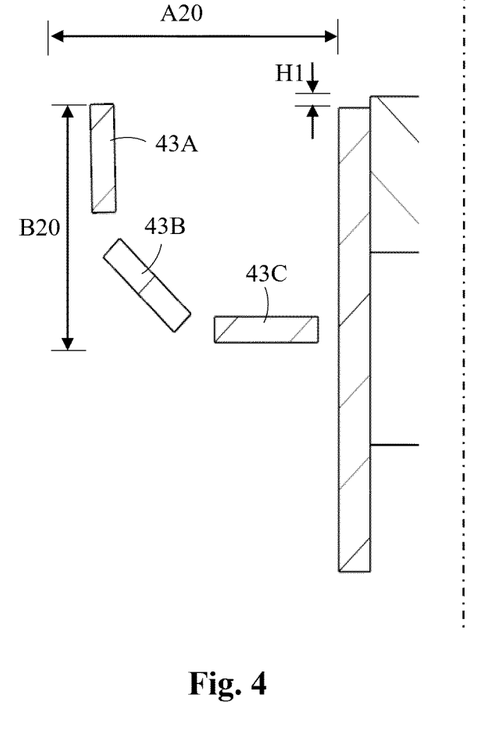
FIG. 4 shows an enlargement of a left-hand end portion of the stator of FIG. 3, FIGS. 5A-5E show a stator segment coil.

FIG. 2 shows a cross section of a stator in an electric machine, FIG. 3 shows an enlargement of the right-hand end portion of the stator of FIG. 2, and FIG. 4 shows an enlargement of the left-hand end portion of the stator of FIG. 2.

FIG. 2 shows the stator core 30 extending in the axial direction between the ends of the stator. The stator core 30 may be provided with axially extending grooves receiving a straight portion of the coils of the stator winding. The axial grooves may extend inwards from an outer surface of the stator core 30. The axial grooves may extend along the length L30 of the stator core 30. There may further be end spaces L31, L32 at both ends of the stator core 30 in the electric machine. The end spaces L31, L32 may receive the ends 42A, 42B, 42C, 43A, 43B, 43C of the stator winding. The end spaces L31, L32 at the ends of the electric machine may provide only a limited space for the ends 42A, 42B, 42C, 43A, 43B, 43C of the stator winding. This may e.g., be the case in wind turbines where the end spaces L31, L32 in the electric machine might be very restricted. It may thus be a challenge to accommodate the ends 42A, 42B, 42C, 43A, 43B, 43C into these limited end spaces L31, L32. The stator winding is formed of three stator coils. The ends 42A, 43A of the first stator coil are straight, the ends 42B, 43B of the second stator coil are bent 45 degrees, and the ends 42C, 43C of the third stator coil are bent 90 degrees.

FIG. 3 shows the right-hand end space L31 of the electric machine. The boundary dimensions in the right-hand end space L31 in this example electric machine may be A10=220 mm and B10=170 mm. A minimum distance H1 from the top of the coil to the outer radius of the segment may be 5 mm.

The right-hand end 42A, 42B, 42C of the stator winding should in this example electric machine fit into these boundary dimensions.

FIG. 4 shows the left end space L32 of the electric machine. The boundary dimensions in the left-hand end space L32 in this example electric machine may be A20=232 mm, B20=225 mm. A minimum distance H1 from the top of the coil to the outer radius of the segment may be 5 mm.

The left-hand end 43A, 43B, 43C of the stator winding should in this example electric machine fit into these boundary dimensions.

FIGS. 5A-5E show a stator segment coil.

Figure 5A:
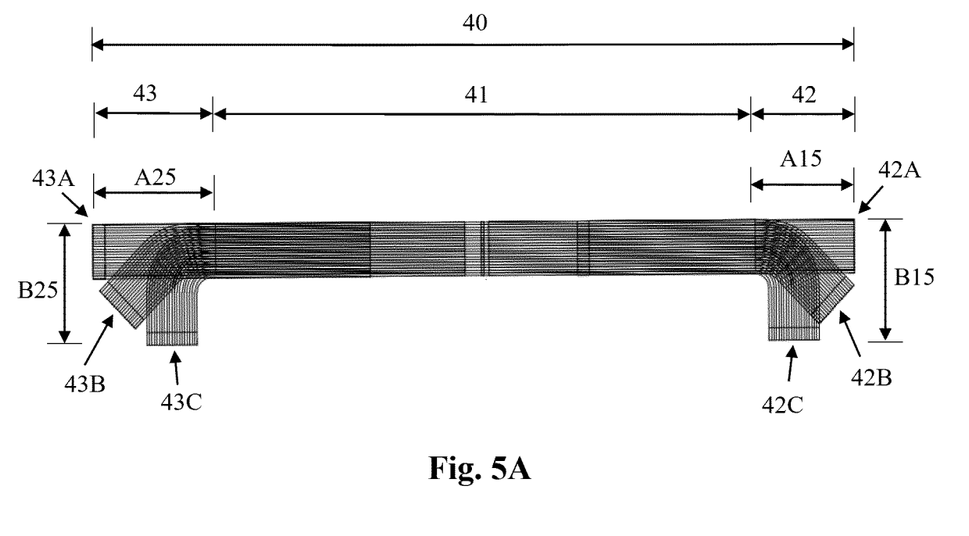

FIG. 5A shows three stator coils. Each stator coil 40 comprises a centre portion 41 and two opposite end portions 42, 43. The centre portions 41 of all stator coils are straight. The end portions 42A, 43A of a first stator coil are straight, the end portions 42B, 43B of a second stator coil are bent 45 degrees, and the end portions 42C, 43C of a third stator coil are bent 90 degrees.

The dimensions in the right hand first end portion 42 of the stator coils may be A15=186.56 mm, B15=210.23 mm in this example electric machine.

The dimensions in the left-hand end portion 43 of the stator coils may be A25=228.94 mm, B25=211.44 mm in this exemplary electric machine.

These dimensions are within the boundary conditions at the ends of the electric machine shown in FIGS. 3 and 4.

Figure 5B:
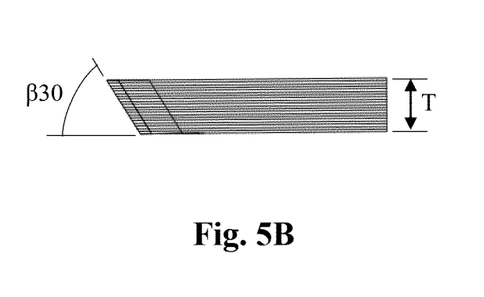

FIG. 5B shows a stack of coil loops in the second stator coil stacked upon each other in a staggered way.

The dimension T=94 mm designates the thickness of whole stack of coil elements including the isolation of the coil elements. The inclination angle β30=53 degrees designates the inclination of the staggered stack of coil elements.

Figure 5C:
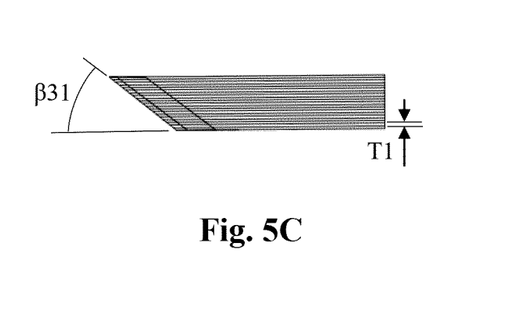

FIG. 5C shows a stack of coil loops in the third stator coil stacked upon each other in a staggered way.

The dimension T1=4.7 mm designates the thickness of one coil element including the isolation of the coil element. The number N of coil elements may be 20 in the stack of coil elements. The inclination angle β31=34 degrees designates the inclination of the staggered stack of coil elements.

Figures 5D, 5E:
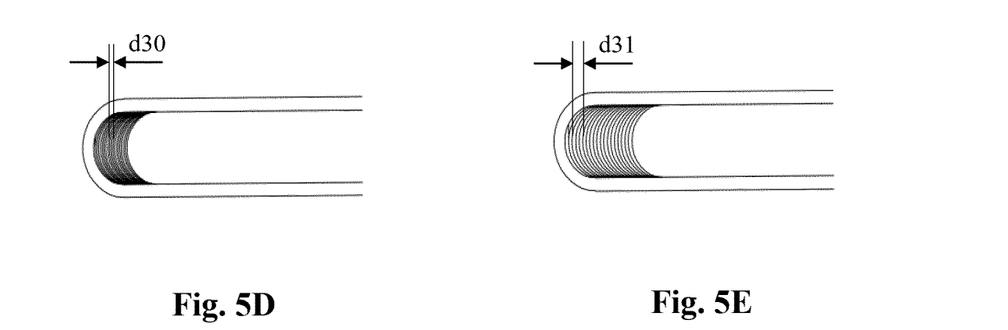

FIG. 5D shows a stack of coil loops in the second stator coil stacked upon each other in a staggered way.

The dimension d30=3.69 mm designates the staggering of the coil loops in the stack of coil loops.

FIG. 5E shows a stack of coil loops in the third stator coil stacked upon each other in a staggered way.

The dimension d31=7.38 mm designates the staggering of the coil loops in the stack of coil loops.

Figure 6:
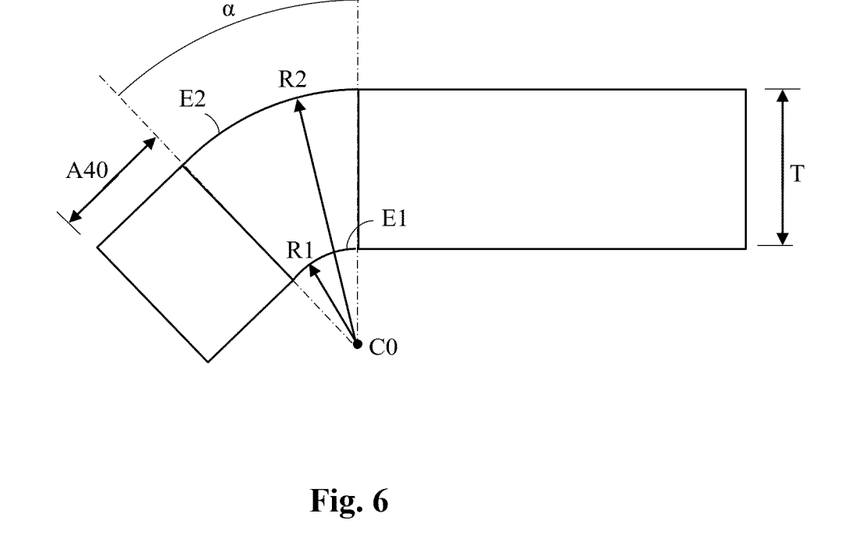
FIG. 6 shows the end of a 45-degree bended stator segment coil.
Figure 7:
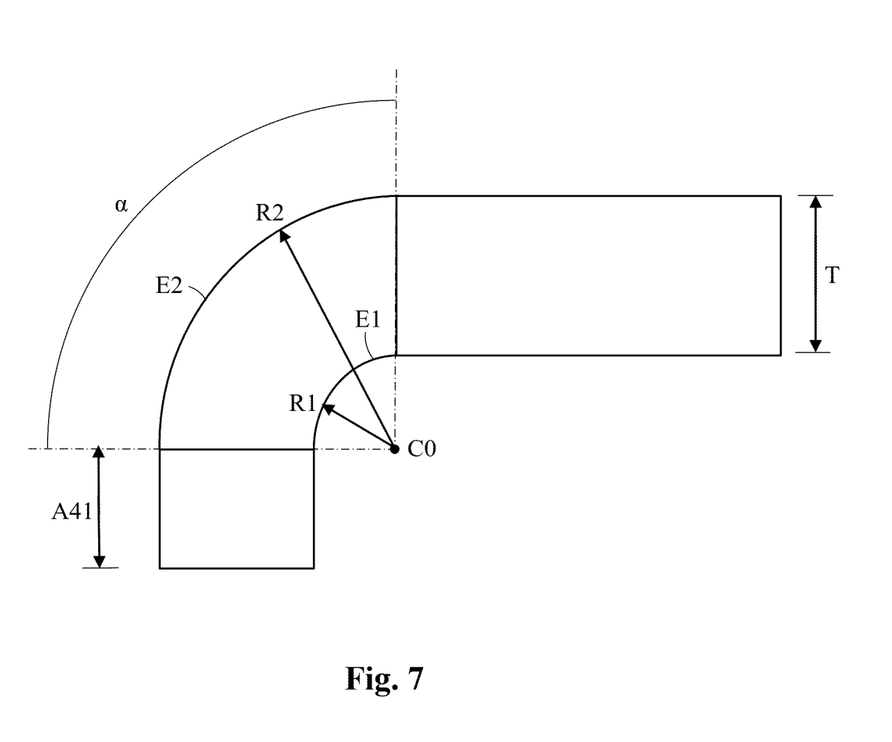
FIG. 7 shows the end of a 90-degree bended stator segment coil.

FIG. 6 shows the end of a 45-degree bended stator segment coil and FIG. 7 shows the end of a 90-degree bended stator segment coil.

The calculation of the staggering of the coil loops in the stack of coil loops will be exemplified by reference to these figures.

The stack of coil loops may be bent at an angle α=45 degrees or 90 degrees as shown in the example in the figures. The bending radius R1 of the bottom surface of the lowermost coil loop in the stack of coil loops is in this example 25 mm. The thickness of the stack of coil loops is T=94 mm. The bending radius R2 of the top surface of the uppermost coil loop in the stack of coil loops is R2=R1+T. C0 designates the centre of the bending radiuses R1 and R2.

The length of the inner arc E1 in the stack of coil loops is:

$$E1 = \frac{\alpha}{360} * 2 * R1 * \pi$$

The length of the outer arc E2 in the stack of coil loops is:

$$E2 = \frac{\alpha}{360} * 2 * (R1 + T) * \pi$$

The difference in length between the outer arc E2 and the inner arc E1 in the stack of coil loops is:

$$E2 - E1 = \frac{\alpha}{360} * 2 * \pi * T$$

The staggering d between adjacent coil loops in the stack of coil loops containing N coil loops is thus:

$$d = (E2 - E1)/N = \left(\frac{\alpha}{360} * 2 * \pi * T\right)/N$$

The staggering d between adjacent coil loops in the stack of coil loops containing N=20 coil loops with a total thickness T=94 mm is 3.69 mm when the bending angle $\alpha$ is 45 degrees and 7.48 mm when the bending angle $\alpha$ is 90 degrees.

The inclination angle $\beta$ of the stack of coil loops shown in FIGS. 5B and 5C designated as inclination angles 1330 and 1331 can be calculated in the following way:

$$\beta = \arctan\left(\frac{T}{E2 - E1}\right)$$

The inclination angle $\beta$30 with a 45-degree bending angle of the stack of coil loops is thus 34 degrees and the inclination angle $\beta$31 with a 90-degree bending angle of the stack of coil loops is thus 53 degrees.

The length of the coil loops A40, A41 after the bend need to be 92 mm or less in the 90-degree coil and 115 mm or less in the 45-degree coil.

Figure 8:
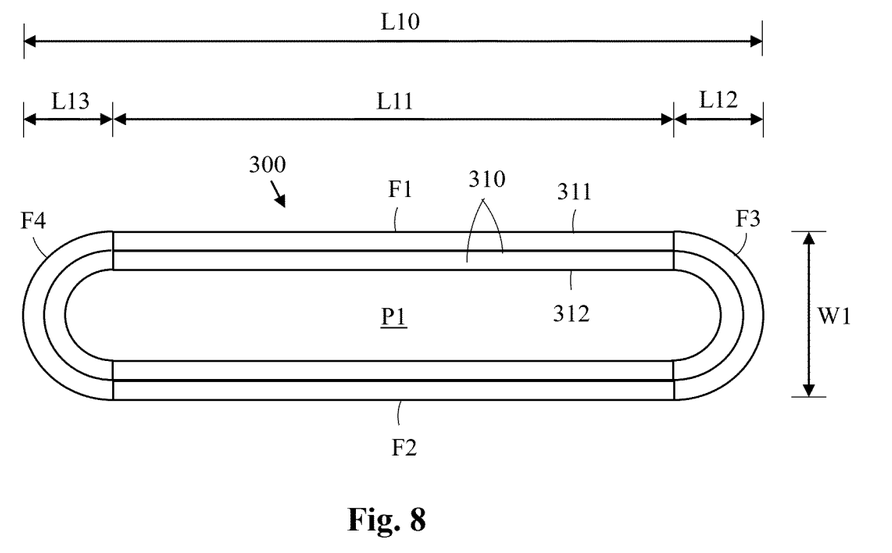
FIG. 8 shows a coil loop.

FIG. 8 shows a coil loop.

An electric conductor 310 is bent into a coil loop 300. The electric conductor 310 may be formed of two electrical conductor elements 311, 312. The two electrical conductors 311, 312 may be nested so that they run in a common first plane P1. Each of the two electrical conductors 311, 312 may have a rectangular cross-section. The dimension of each electric conductor 311, 312 may be 10*4.35 mm in this example embodiment. The longer side of the rectangle may be seating against a first plane P1.

The coil 300 may, however, be formed of an electric conductor 310 comprising only one conductor element or more than two conductor elements. The coil 300 may thus be formed of an electric conductor 310 comprising at least one conductor element.

The coil loop 300 may have two parallel straight side portions F1, F2 running at a distance from each other in a longitudinal direction and two opposite curved end portions F3, F4 connecting the ends of the side portions F1, F2 into a coil loop 300. The side portions F1, F2 and the end portions F3, F4 may run in the first plane P1. The curve of the end portions F3, F4 may be formed of a half-circle.

The coil loop 300 has a length L10 in the longitudinal direction L and a width W1 in a transverse direction. The longitudinal direction L is determined by the longitudinal direction of the straight side portions F1, F2 of the coil loop 300. The straight portions F1, F2 of the coil loop 300 have a length L11 in the longitudinal direction L. The curved end portions F3, F4 have a length L12, L13 in the longitudinal direction.

The coil loop 300 may be produced so that the length L10 of the coil loop 300 in a stack of coil loops 300 varies. The length L10 of the coil loops 300 may vary so that the length of a step between adjacent coil loops 300 in the stack 400 of coil loops 300 remains constant throughout the stack 400 of coil loops 300. The length of the step is measured in the longitudinal direction L of the coil loops 300. The length of the step is measured between the outermost points in the longitudinal direction L of the curved end portions of the coil loops 300. A predetermined staggering of the coil loops 300 in the end portions F3, F4 of the stack of coil loops 300 may be achieved in this way.

The stack of coil loops 300 may be produced from a continuous conductor 310 by bending so that a stack of coil loops 300 is formed with a desired staggering between adjacent coil loops 300 in the end portions F3, F4 of the stack coil loops 300.

Figure 9:
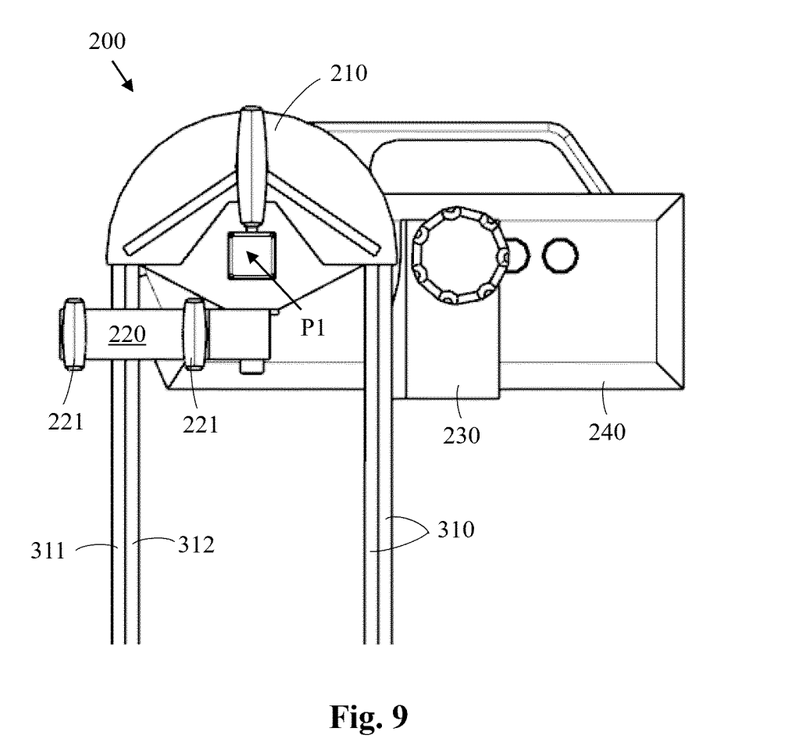
FIG. 9 shows bending of a conductor.

FIG. 9 shows bending of a conductor.

The figure shows a manual bending device 200 for bending a conductor 310. The conductor 310 may be formed of two conductor elements 311, 312 positioned in a nested manner on a common plane. The cross section of each conductor element 311, 312 may be substantially rectangular. The longer side of the rectangle may be positioned on the plane. The bending radius of the conductor 310 may be 55 mm.

The manual bending device 200 may be used to bend the conductor 310 in a single coil loop 300 at a time. The bending device 200 may comprise two parallel guide plates 210, a holder 220 and a back stopper 230. The back stopper 230 may be attached to a rotatable frame part 240. The rotatable frame part 240 may be rotatable around a pivot point P1. The two parallel guide plates 210 and the holder 220 are stationary. The rotatable frame part 240 is shown in the end position in the figure i.e., in the position after the bending of the conductor 310. The rotatable frame part 240 may be rotated 180 degrees in the counter-clockwise direction in order to reach the start position. The holder 220 may comprise a bottom plate and an upper bar. The upper bar may be attached with locking bolts 221 to the bottom plate.

There may be a curved surface between the guide plates 210 having a desired bending radius e.g., 55 mm in this example. The back stopper 230 may be of a material which allows sliding of back stopper 230 on the conductor 310. The holder 220 holds the conductor 310 in place during the bending.

The locking bolts 221 and the upper bar may first be removed from the holder 220 after which the conductor 310 may be positioned into holder 220 on the bottom plate. The upper bar may thereafter be attached with the locking bolts 221 to the holder 220. The locking bolts 221 may be tightened when the conductor 300 is in correct position in the holder 220. The rotatable frame part 240 is in the start position when the conductor 300 is positioned into the holder 220. The rotatable frame 240 may thereafter be rotated in the clockwise direction 180 degrees into the end position, whereby the conductor 300 will be bent around the curved surface between the two guide plates 210. The back stopper 230 will slide on the outer surface of the conductor 310 during this bending operation.

The conductor 310 may be formed of two conductor elements 311, 312. Each of the two conductor elements 311, 312 may be provided with an electrical insulation of their own. The outer conductor element 311 and the inner conductor element 312 may thus be electrically isolated from each other.

Each coil loop 300 in a stack of coil loops 300 may be bent one at a time with the manual bending device 200. The stack of coil loops 300 may be produced in a continuous process so that the bending points are positioned at a distance from each other in order to achieve the desired staggering at the opposite ends of the stack of coil loops 300. It is thus possible to produce manually a stack of coil loops 300 in which the end portions F3, F4 of the coil loops 300 are staggered in a desired way with the bending device 200.

The process of bending the coil loops 300 in the stack of coil loops 300 may naturally be automated so that the coil loops 300 in the stack of coil loops 300 is produced in a continuous way with an automated process. Any prior art method suitable for bending coil loops 300 into the form shown in FIG. 8 may be used in order to produce the stack of coil loops 300 in which there is a staggering between each coil loop 300 in the stack of coil loops 300 at the end portions F3, F4 of the stack of coil loops 300.

Figure 10:
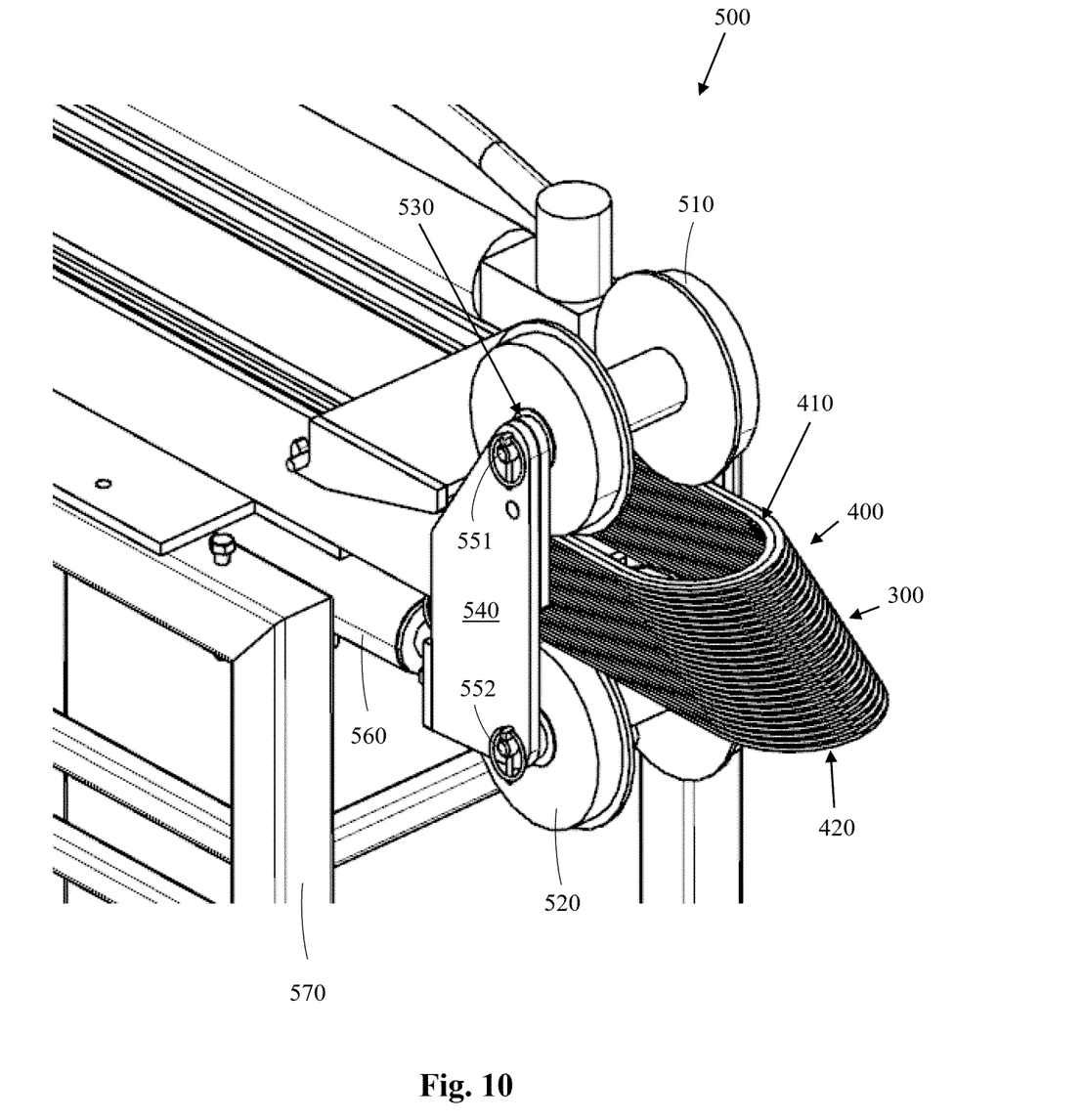
FIG. 10 shows a first view of the bending of a stator segment coil.

FIG. 10 shows a first view of the bending of a stator segment coil.

The figure shows one end of a stack 400 of coil loops 300, whereby each of the coil loops 300 in the stack 400 of coil loops 300 has in a previous stage shown in FIG. 9 been bent into a coil loop as shown in FIG. 8. The conductor 310 in the coil loop 300 may be formed of two conductor elements i.e., an outer conductor element 311 and an inner conductor element 312. The outer conductor element 311 and the inner conductor element 312 may be positioned in a common first plane.

The coil loops 300 have been arranged in the stack 400 of coil loops 300 so that the desired staggering d between each coil loop 300 in the stack 400 of coil loops 300 is achieved.

The stack 400 of coil loops 300 may be bent in a bending press 500. The stack 400 of coil loops 300 may be bent in a direction perpendicular to the longitudinal direction L of the stack of coil loops 300.

The bending press 500 may comprise a main frame 570 supporting the devices in the bending press.

The bending press 500 may comprise a first roll device 510 and a second roll device 520. The first roll device 510 may form an upper roll device and the second roll device 520 may form a lower roll device. The first roll device 510 may be formed of two separate parallel rolls connected with a shaft. The second roll device 520 may also be formed of two separate parallel rolls connected with a shaft. Each of the rolls in the first roll device 510 and in the second roll device 520 act on a respective branch of the stack 400 of coil loops 300.

The stack 400 of coil loops 300 may be positioned in the bending press 500 so that a first surface 410 of the stack 400 of coil loops 300 seats against the first roll device 510 and a second surface 420 of the stack 400 of coil loops 300 seats against the second roll device 520. The length L10 of the coil loops 300 in the stack 400 of coil loops 300 is decreasing from the second surface 420 towards the first surface 410 in the stack 400 of coil loops 300. The length L10 may decrease linearly in the stack 400 of coil loops 300. The decrease in the length L10 may be realized in the straight portions F1, F2 of the coil loops 300. The curved portions F3, F4 of each coil loop 300 may be identical.

The first roll device 510 may be supported on a stationary frame 530. The stationary frame 530 may comprise two stationary support arms. A first shaft 551 may pass through the first roll device 510 and through the support arms in the stationary frame. The first roll device 510 may thus be supported via the first shaft 551 on the stationary frame 530. The first roll device 510 may be positioned between the support arms of the stationary frame 530. The stationary frame 530 may be supported on the main frame 570 of the bending press 500.

The second roll device 520 may be supported on a swing frame 540. The swing frame 540 may comprise two swing arms. An upper end of the swing arms may be rotatable supported on an outer end of the first shaft 551. The two swing arms in the swing frame 540 may be positioned axially outside the two support arms in the stationary frame 530. The second roll device 520 may be positioned between the swing arms of the swing frame 540.

A second shaft 552 may pass through the second roll device 520 and through the swing arms of the swing frame 540. The second roll device 520 may be rotatably supported on the second shaft 552. The swing arms of the swing frame 540 may be rotatably supported on the outer ends of the first shaft 551.

The first roll device 510 comprises in this embodiment two rolls i.e., a roll for each branch of the stack of coil elements. The first roll device 510 may, however, be formed of a single cylinder extending over both branches of the stack of coil elements. The diameter of the first roll device 510 may be 2*R1=50 mm. The first roll device 510 may be stationary i.e., non-rotating.

The second roll device 520 comprises in this embodiment two rolls i.e., a roll for each branch of the stack of coil elements. The second roll device 520 may, however, be formed of a single cylinder extending over both branches of the stack of coil elements.

The first shaft 551 and the second shaft 552 are parallel.

The swing frame 540 may be operated by a piston-cylinder actuator 560. The piston-cylinder actuator 560 may provide the force needed to turn the swing frame 540 around the first shaft 551 so that the stack of coil elements 40 may be bent to a desired bending angle.

Figure 11:
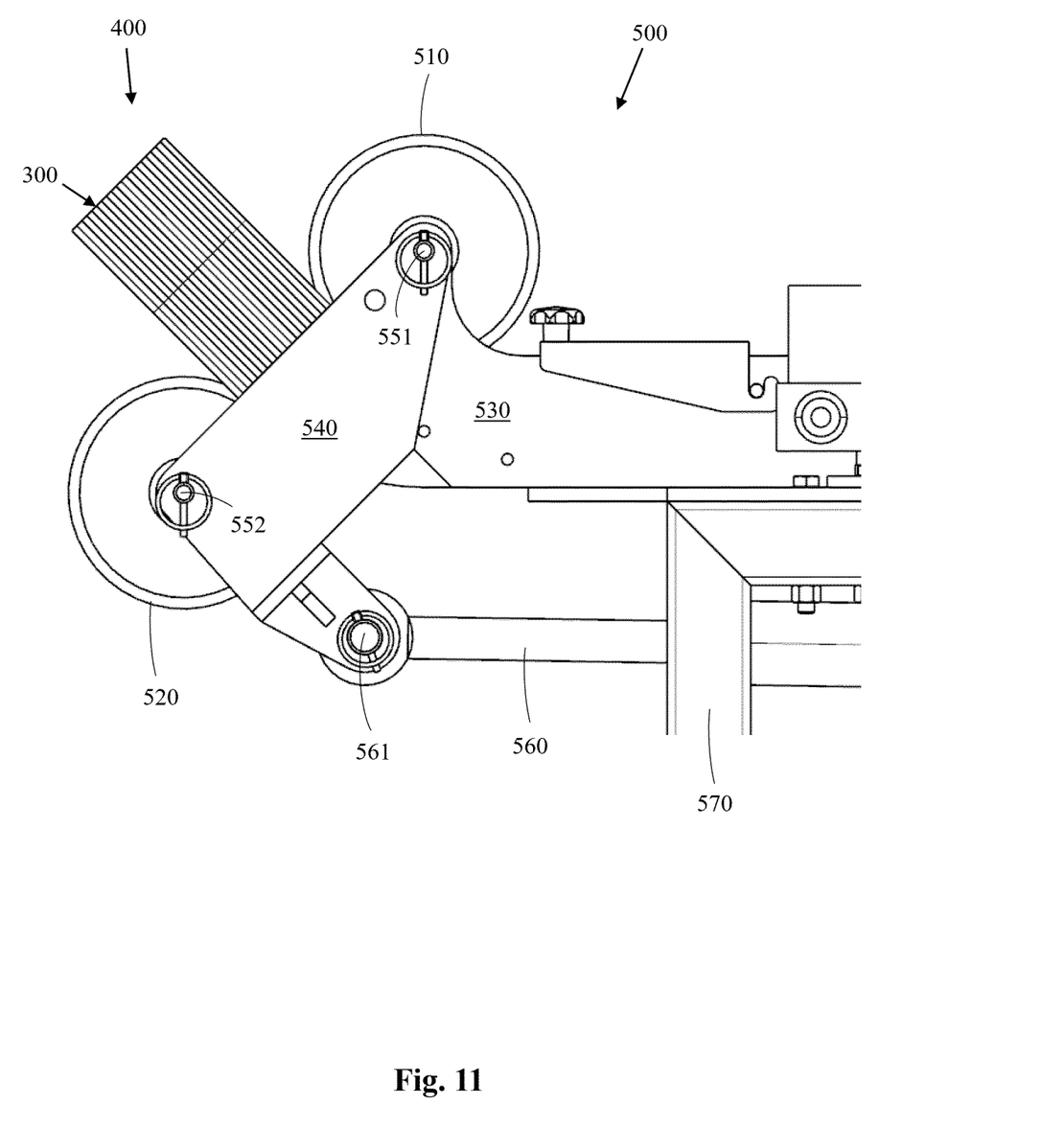
FIG. 11 shows a second view of the bending of a stator segment coil.

FIG. 11 shows a second view of the bending of a stator segment coil.

The figure shows a stator segment coil, whereby the end of the stator segment coil that has been bent into a 45-degree angle.

Each conductor element 311, 312 in the conductor 310 is separately electrically isolated. The two conductor elements 311, 312 are thus electrically isolated from each other.

The stack 400 of coil loops 300 will further be isolated after the bending of the end portions F3, F4 have been done.

The straight portions F1, F2 of the stack 400 of coil loops 300 will be positioned in the axial grooves on the stator core. The end portions F3, F4 of the stack 400 of coil loops 300 will be positioned in the end spaces L31, L32 in the electric machine.

The piston-cylinder actuator 560 may be connected via a shaft 561 to the swing frame 540.

The figure also shows a part of the main frame 570.

Figure 12:
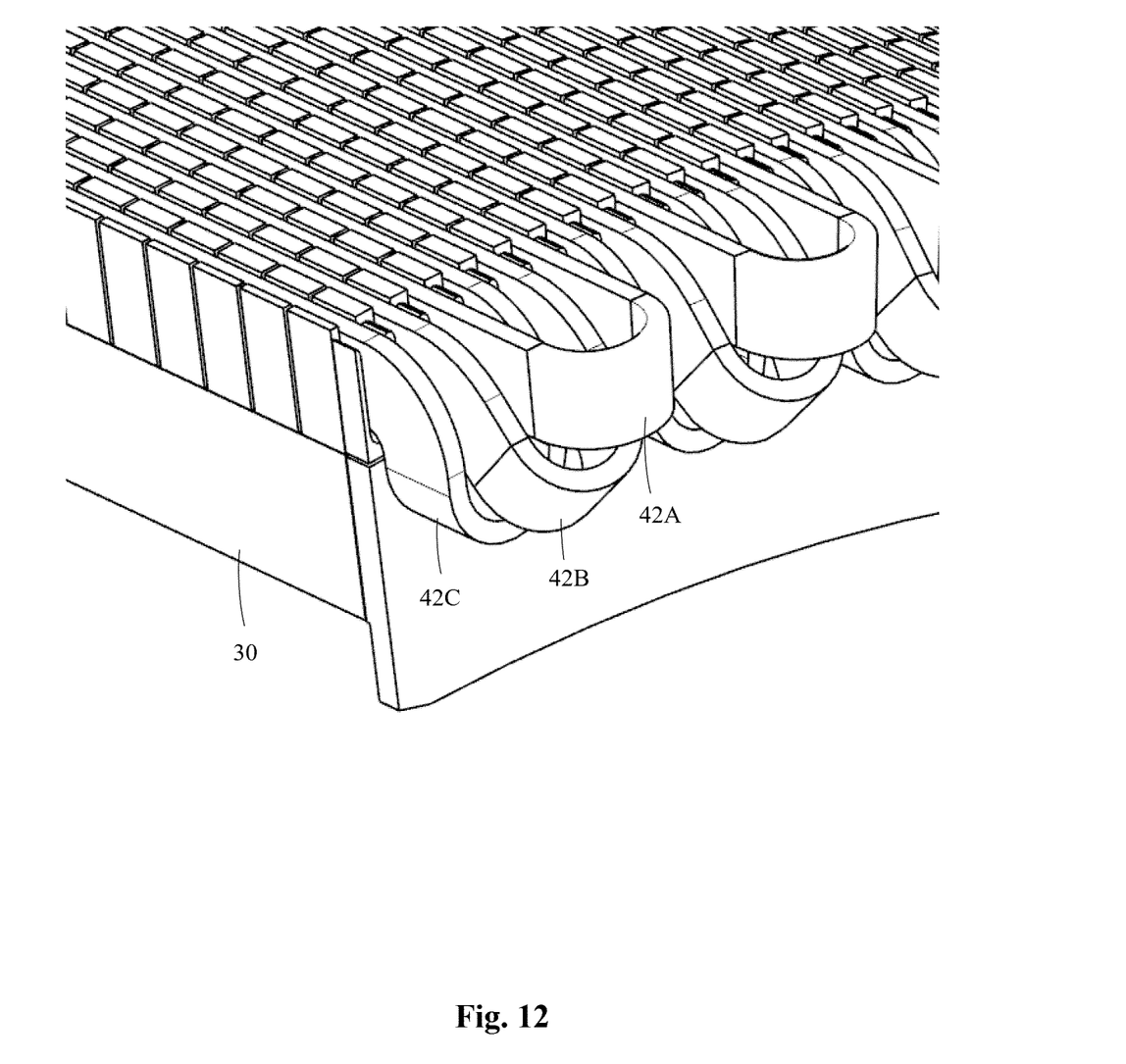
FIG. 12 shows a view of the end of the stator of an electric machine.

FIG. 12 shows a view of the end of the stator of an electric machine.

The figure shows a portion of a segment of the stator core with the stator windings. The end portions 42A, 42B, 42C of the three stacks of stator coil loops protrude out from the axial ends of the stator segment. The straight portions of the stator coil loops run in the grooves in the stator core 30.

The conductor 310 of which the stack 400 of coil loops 300 forming the segment coil has been produced forms a closed loop with two open ends protruding into one of the end spaces L31, L32 of the electric machine. The open ends can be connected through end connection rings to other stacks of coil loops in the electric machine.

The figures show only one example of a segment coil of a stator of an electric machine. The example is related to a big electric machine having a power of several MW.

The inventive method for producing a segment coil is not in any way limited to the example described in the figures. The inventive method can be applied to any segment coil formed of coil loops. The bending angle α in the example in the figures is 45 degrees and 90 degrees. The bending angle α can naturally be any angle greater than 0 degrees.

It will be obvious to a person skilled in the art that, as the technology advances, the inventive concept can be implemented in various ways. The invention and its embodiments are not limited to the examples described above but may vary within the scope of the claims.

The invention claimed is:

1. A method for producing a segment coil comprising:
producing a stack of coil loops from a continuous electrical conductor including at least one electrical conductor element with a rectangular cross-section, each coil loop having two parallel straight side portions running at a distance from each other in a longitudinal direction and two opposite curved end portions connecting the ends of the side portions,
producing the stack of coil loops so that a length in the longitudinal direction of each coil loop in the stack of coil loops decreases, whereby a staggered end portion is formed at each end of the stack of coil loops, and
bending the end portion of the stack of coil loops into a predetermined bending angle in relation to the longitudinal direction in a direction such that an outer end of the end portion of the stack of coil loops is substantially straight when the stack of coil loops is bent into the predetermined bending angle, whereby the staggering of adjacent coil loops in the end portion of the stack of coil loops has been determined so that the outer end of the end portion of the stack of coil loops is substantially straight in response to said bending,
wherein the bending of the end portions of the stack of coil loops being done in a bending press including a first roll device being supported via a first shaft on a stationary frame and a second roll device being rotatably supported via a second shaft on a swing frame, the first shaft and the second shaft being parallel, the swing frame being rotatably supported on the first shaft, a first surface of the stack of coil loops being positioned against the first roll device and a second opposite surface of the stack of coil loops being positioned against the second roll device, the first roll device forming an inner bending radius for the stack of coil loops when the swing frame is turned around the first shaft so that the second roll device rotates on the second surface of the stack of coil loops in order to bend the stack of coil loops,
wherein the staggering of adjacent coil loops in the end portions of the stack of coil loops is determined by the following equation:

$$d = \left(\frac{\alpha}{360} * 2 * \pi * T\right)/N$$

where d=staggering between adjacent coil loops, α=bending angle of the stack of coil loops, T=thickness of the stack of coil loops, N=number of coil loops in the stack of coil loops.

2. The method according to claim 1, wherein a staggering step between adjacent coil loops in the end portions of the stack of coil loops is constant throughout the stack of coil loops.

3. An arrangement for producing a segment coil comprising:
a bending press for bending end portions of a stack of coil loops, the bending press including a first roll device being supported via a first shaft on a stationary frame and a second roll device being rotatably supported via a second shaft on a swing frame, the first shaft and the second shaft being parallel, the swing frame being rotatably supported on the first shaft, a first surface of the stack of coil loops being positioned against the first roll device and a second opposite surface of the stack of coil loops being positioned against the second roll device, the first roll device forming an inner bending radius for the stack of coil loops when the swing frame is turned around the first shaft so that the second roll device rotates on the second surface of the stack of coil loops in order to bend the stack of coil loops,
wherein the staggering of adjacent coil loops in the end portions of the stack of coil loops is determined by the following equation:

$$d = \left(\frac{\alpha}{360} * 2 * \pi * T\right)/N$$

where d=staggering between adjacent coil loops, α=bending angle of the stack of coil loops, T=thickness of the stack of coil loops, N=number of coil loops in the stack of coil loops.

4. A method for producing a segment coil comprising:
producing a stack of coil loops from a continuous electrical conductor, the continuous electrical conductor including at least one electrical conductor element with a rectangular cross-section, each coil loop having two parallel straight side portions running at a distance from each other in a longitudinal direction and two opposite curved end portions connecting the ends of the side portions, wherein the two opposite curved end portions of the coil loops constitute opposite end portions of the stack,
producing the stack such that lengths of the coil loops in the longitudinal direction constantly decrease from one side of the stack to an opposing side of the stack to form a constant step in a staggering arrangement at each end portion of the stack, and
bending each end portion of the stack into a predetermined bending angle in relation to the longitudinal direction in a direction such that an outer end of the end portion of the stack is substantially straight when the stack of coil loops is bent into the predetermined bending angle, whereby the staggering arrangement of adjacent coil loops in each end portion of the stack provides for the stack to have outer ends that are substantially straight in response to the bending into the predetermined bending angle, wherein the bending of the end portions of the stack of coil loops is done in a bending press including a first roll device being supported via a first shaft on a stationary frame and a second roll device being rotatably supported via a second shaft on a swing frame, the first shaft and the second shaft being parallel, the swing frame being rotatably supported on the first shaft, a first surface of the stack of coil loops being positioned against the first roll device and a second opposite surface of the stack of coil loops being positioned against the second roll device, the first roll device forming an inner bending radius for the stack of coil loops when the swing frame is turned around the first shaft so that the second roll device rotates on the second surface of the stack of coil loops in order to bend the stack of coil loops, wherein the staggering of adjacent coil loops in the end portions of the stack of coil loops is determined by the following equation:

$$d = \left(\frac{\alpha}{360} * 2 * \pi * T\right)/N$$

where d=staggering between adjacent coil loops, α=bending angle of the stack of coil loops, T=thickness of the stack of coil loops, N=number of coil loops in the stack of coil loops.

* * * * *